United States Patent
Lee et al.

(10) Patent No.: US 9,465,251 B2
(45) Date of Patent: Oct. 11, 2016

(54) LIGHT EMITTING DIODE PACKAGE AND LIQUID CRYSTAL DISPLAY DEVICE INCLUDING THE SAME

(71) Applicant: LG Display Co., Ltd., Seoul (KR)

(72) Inventors: Kyu-Hwan Lee, Dongducheon-si (KR); Min-Su Cho, Paju-si (KR); Gwan-Hoon Park, Seoul (KR); Seo-Yoon Lee, Seoul (KR); Ji-Seok Yang, Paju-si (KR); Seung-Won Lee, Yeosu-si (KR)

(73) Assignee: LG Display Co., Ltd., Seoul (KR)

( * ) Notice: Subject to any disclaimer, the term of this patent is extended or adjusted under 35 U.S.C. 154(b) by 202 days.

(21) Appl. No.: 14/523,109

(22) Filed: Oct. 24, 2014

(65) Prior Publication Data
US 2015/0116634 A1    Apr. 30, 2015

(30) Foreign Application Priority Data
Oct. 30, 2013    (KR) .................. 10-2013-0130088

(51) Int. Cl.
*G02F 1/13357*    (2006.01)
*G02F 1/1335*    (2006.01)
*G02B 19/00*    (2006.01)

(52) U.S. Cl.
CPC ..... *G02F 1/133606* (2013.01); *G02B 19/0028* (2013.01); *G02B 19/0061* (2013.01); *G02B 19/0071* (2013.01); *G02F 1/133603* (2013.01); *G02F 2001/133607* (2013.01)

(58) Field of Classification Search
CPC .................. G02B 19/0061; G02F 1/133606
USPC ........................................... 257/98
See application file for complete search history.

(56) References Cited

U.S. PATENT DOCUMENTS

| | | | | |
|---|---|---|---|---|
| 6,896,381 B2* | 5/2005 | Benitez | ............. | G02B 19/0061 359/856 |
| 2010/0073928 A1* | 3/2010 | Kim | ......................... | F21V 5/04 362/245 |
| 2010/0109034 A1* | 5/2010 | Bierhuizen | ......... | B29C 45/1671 257/98 |
| 2014/0056007 A1* | 2/2014 | Chou | ..................... | F21V 13/04 362/308 |
| 2014/0307421 A1* | 10/2014 | Lee | ..................... | G02B 19/0071 362/97.3 |
| 2015/0077976 A1* | 3/2015 | Jiang | ........................ | F21V 5/04 362/97.2 |

FOREIGN PATENT DOCUMENTS

KR    10-2009-0015854 A    2/2009

* cited by examiner

*Primary Examiner* — Nimeshkumar Patel
*Assistant Examiner* — Christopher Raabe
(74) *Attorney, Agent, or Firm* — Dentons US LLP

(57) ABSTRACT

A light emitting diode package includes: a light emitting diode (LED); and an LED lens over the LED, the LED lens having a symmetrical shape with respect to a central axis, wherein the LED lens includes a lower surface having first and second lower surfaces, an upper surface and a side surface connecting the lower surface and the upper surface, wherein the light through the first lower surface is totally reflected on the upper surface and is emitted though the side surface, wherein the first lower surface includes a first curved surface extending from the central axis and a second curved surface extending from a first end portion of the first curved surface, and wherein the second lower surface is flat and extends from a second end portion of the second curved surface.

20 Claims, 14 Drawing Sheets

LIGHT EMITTING DIODE PACKAGE AND LIQUID CRYSTAL DISPLAY DEVICE INCLUDING THE SAME

CROSS REFERENCE TO RELATED APPLICATIONS

This application claims the benefit of Korean Patent Application No. 10-2013-0130088, filed on Oct. 30, 2013, which is hereby incorporated by reference in its entirety for all purposes as if fully set forth herein.

BACKGROUND OF THE INVENTION

1. Field of the Invention

The present invention relates to a light emitting diode (LED) package. More specifically, the present disclosure relates to an LED package having an increased brightness and a liquid crystal display (LCD) device including the LED package.

2. Discussion of the Related Art

Liquid crystal display (LCD) devices, which are advantageous in displaying moving images and widely used for the displays of portable devices, computers and televisions due to their high contrast ratio, display images based on optical anisotropy and polarization of liquid crystal molecules.

An LCD device has a liquid crystal (LC) panel that may include two substrates having two electrodes thereon and a liquid crystal layer between the two substrates. The arrangement direction of the liquid crystal molecules in the liquid crystal layer may be adjusted by changing the electric field generated between the two electrodes, and the transmittance of the liquid crystal layer is thus changed to display various images.

However, since the LCD device does not include an emissive element, an additional light source is required to display an image. Thus, a backlight unit including a light source is typically disposed on a rear surface of the LC panel.

Although a fluorescent lamp such as a cold cathode fluorescent lamp (CCFL) or an external electrode fluorescent lamp (EEFL) has been used as a light source of the backlight unit, the fluorescent lamp has been replaced with a light emitting diode (LED) that has advantages in power consumption, weight and brightness in accordance with the need for LCD devices of thin profile and lightweight.

The backlight unit may be classified into a direct type and an edge type according to a position of the light source. In the direct type backlight unit, since the light source is disposed under the LC panel, the light emitted from the light source is directly supplied to the LC panel. In the edge type backlight unit, since a light guide plate is disposed under the LC panel and the light source is disposed on at least one side surface of the light guide plate, the light emitted from the light source is indirectly supplied to the LC panel using refraction and reflection in the light guide plate. The direct type backlight unit has advantages in image quality and clarity as compared with the edge type backlight unit.

Since the light emitted from the LED has a relatively narrow emission region of high intensity, a large number of LEDs are disposed in the direct type backlight unit for supplying a uniform surface light to a display region of the LC panel. However, such an increase of the number of LEDs entails an increase of the fabrication cost of the LCD devices.

To reduce the fabrication cost, a lens for widening an emission region of the light from the LED has been developed and applied to the LED so that the light from the LED can be diffused to a wider region. Specifically, as the LCD device is applied for a desktop monitor and a wall-mountable television as well as a portable computer, the LCD device with low price, high quality, thin profile and wide display area, is preferred. As a result, the LCD device for which the fabrication cost is reduced with thin profile and high quality by reducing the number of LEDs has been researched.

FIGS. 1A and 1B are cross-sectional views showing a light emitting diode package according to the related art.

In FIG. 1A, a first LED package includes an LED 29a and a first LED lens 10. The first LED lens 10 includes a first curved surface 11 having a first curvature, a second curved surface 12 having a second curvature and a plane surface 13 connecting the first and second curved surfaces 11 and 12. A first light a1 emitted from the LED 29a enters the first curved surface 11 and is refracted at the first curved surface 11 to be a second light a2. In addition, the second light a2 is refracted again at the second curved surface 12 to be emitted as a third light a3.

The first LED lens 10 is a refractive type where the light of the LED 29a is emitted from the first LED package through refraction at the first and second curved surfaces 11 and 12. Since an irradiation angle of the first LED package is determined by a refractive index of the material used for the first LED lens 10, it is hard to obtain an irradiation angle over about 155 degrees when a typical material such as polymethylmethacrylate (PMMA) or polycarbonate (PC) is used for the first LED lens 10.

In FIG. 1B, a second LED package includes an LED 29a and a second LED lens 20. The second LED lens 20 includes a plane surface 21, a slanting surface 22, and a side surface 23 connecting the plane surface 21 and the slanting surface 22. In addition, the second LED lens 20 is a reflective type and has a symmetrical shape with respective to a central axis CA. A first central light b1 emitted from the LED 29a enters the plane surface 21 and is refracted at the plane surface 21 to become a second central light b2. In addition, the second central light b2 is totally reflected on the slanting surface 22 to be emitted through the side surface 23 as a third central light b3.

Since the second LED lens 20 has the plane surface 21 as an incident surface, an incident angle of the first central light b1 is relatively small as compared with a light entering a curved surface and it is hard to adjust a refracting angle of the second central light b2. As a result, the second LED lens 20 is formed to have a wide radius w so that the second central light b2 through the plane surface 21 can be wholly reflected on the slanting surface 22.

For example, when the second LED lens 20 has the radius w, a first stray light c1 which is emitted toward a portion relatively far from a center of the LED 29a may enter the plane surface 21 and may be refracted at the plane surface 21 to be a second stray light c2. In addition, the second stray light c2 may be totally reflected on the side surface 23 to be emitted through the slanting surface 22 as a third stray light c3. As a result, the light of the LED 29a may not be uniformly diffused and concentrated on a central portion.

To obtain a uniform diffusion, the radius w of the second LED lens 20 is required to be enlarged to a first radius w1 such that the second stray light c2 is totally reflected on the slanting surface 22 and is emitted through the side surface 23 to be a fourth stray light c4.

In addition, when the light from the LED 29a is widely diffused by expanding a width or an emission angle of the LED 29a, the radius of the second LED lens 20 is required to be enlarged. As a result, the parts cost and fabrication cost of the second LED lens 20 increase and the fabrication cost of the LCD device also increases.

Further, since a separation distance between adjacent LEDs 29a is fixed, there is limit in enlargement of the radius of the second LED lens 20. As a result, the LED package including the first and second LED lenses 10 and 20 has limit in increasing the irradiation angle.

SUMMARY OF THE INVENTION

Accordingly, the present invention is directed to a light emitting diode (LED) package, a liquid crystal display (LCD) device including the LED and the method for manufacturing the same that substantially obviates one or more problems due to limitations and disadvantages of the related art.

An advantage of the present invention is to provide a light emitting diode (LED) package, a liquid crystal display (LCD) device including the LED and the method for manufacturing the same that is adapted to increase brightness.

To achieve these and other advantages and in accordance with the purpose of the present invention, as embodied and broadly described, a liquid crystal display (LCD) device may, for example, include a light emitting diode (LED) printed circuit board (PCB); an LED package on the LED PCB, the LED package having an LED and an LED lens on the LED, the LED lens having a substantially symmetrical shape with respect to a central axis; and a liquid crystal panel on the LED package, wherein the LED lens includes a lower surface having first and second lower surfaces, an upper surface and a side surface connecting the lower surface and the upper surface, wherein a light incident on the first lower surface is substantially, totally reflected on the upper surface and is emitted through the side surface, wherein the first lower surface includes a first curved surface extending from the central axis and a second curved surface extending from a first end portion of the first curved surface, and wherein the second lower surface is flat and extends from a second end portion of the second curved surface.

In another aspect of the present invention, a light emitting diode package may, for example, include a light emitting diode (LED); and an LED lens over the LED, the LED lens having a symmetrical shape with respect to a central axis, wherein the LED lens includes a lower surface having first and second lower surfaces, an upper surface and a side surface connecting the lower surface and the upper surface, wherein the light through the first lower surface is totally reflected on the upper surface and is emitted though the side surface, wherein the first lower surface includes a first curved surface extending from the central axis and a second curved surface extending from a first end portion of the first curved surface, and wherein the second lower surface is flat and extends from a second end portion of the second curved surface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings.

Figure 1A:
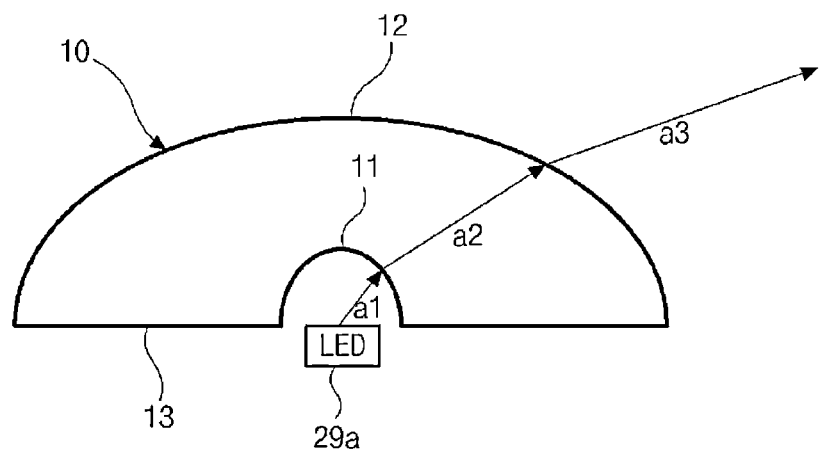
FIG. 1A is a cross-sectional view showing a light emitting diode package according to the related art.
Figure 1B:
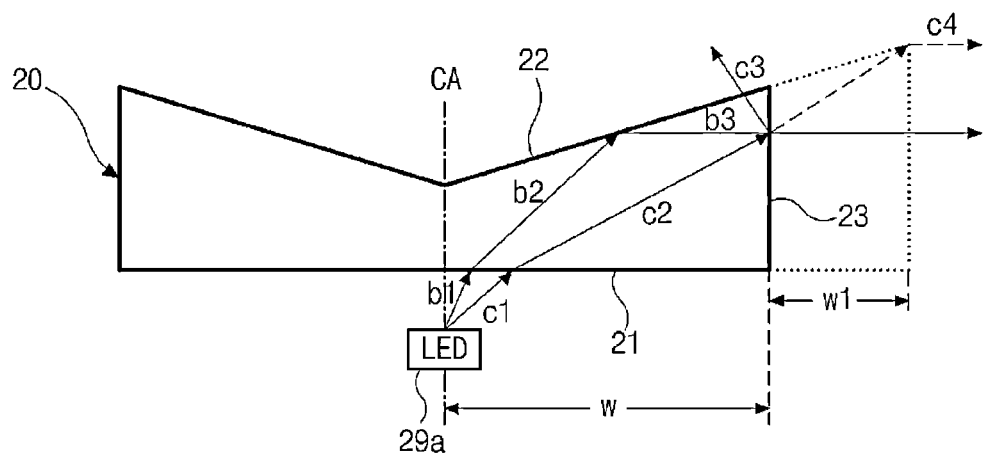
FIG. 1B is a cross-sectional view showing a light emitting diode package according to the related art.
Figure 2:
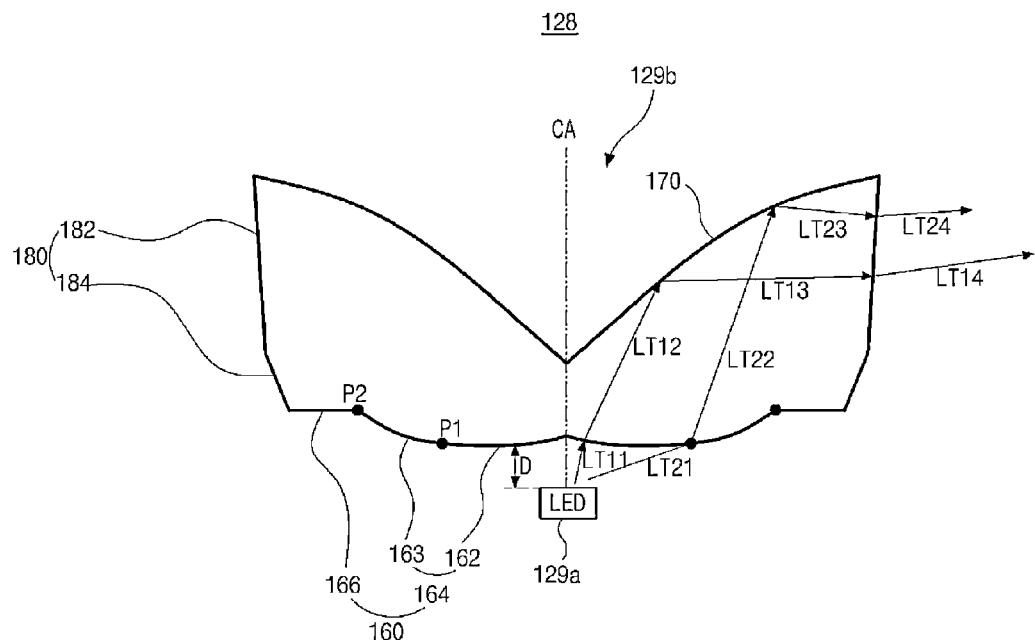
FIG. 2 is a cross-sectional view illustrating a light emitting diode package according to a first embodiment of the present invention.

FIG. 2 is a cross-sectional view illustrating a light emitting diode (LED) package according to the first embodiment of the present invention.

In FIG. 2, the LED package 128 includes an LED 129a and an LED lens 129b. The LED lens 129b includes a lower surface 160, an upper surface 170 and a side surface 180 connecting the lower surface 160 and the upper surface 170. In addition, the LED lens 129b may have a symmetrical shape with respective to a central axis CA. The lower surface 160, the upper surface 170 and the side surface 180 may be referred to as an incident surface, a reflecting surface and an emitting surface, respectively. Further, the LED lens 129b may have a circular shape having a concave central portion.

The lower surface 160 where the light emitted from the LED 129a enters may have first and second lower surfaces 164 and 166. The first lower surface 164 includes a first curved surface 162 extending from the central axis CA and a second curved surface 163 extending from a first end portion P1 of the first curved surface 162. The first curved surface 162 is downwardly convex with a first curvature and the second curved surface 163 is downwardly convex with a second curvature. The first and second curvatures may be the same or different from each other. For example, the second curvature may be equal to or greater than the first curvature.

The first curved surface 162 adjacent to the central axis CA may refract and more outwardly diffuse a first central light LT11 of high intensity emitted from the LED 129a, and the second curved surface 163 separated from the central axis CA may refract and less outwardly diffuse a first stray light LT21 of low intensity emitted from the LED 129a. Since a width of the upper surface 170 may be reduced by the second curved surface 163, a radius of the LED lens 129b and a size of the LED package 128 may be reduced.

The second lower surface 166 extends substantially flat from a second end portion P2 of the second curved surface 163 of the first lower surface 164. The second lower surface 166 may be a plane surface for easily extracting the LED lens 129b from a mold for an injection molding method.

When the LED lens 129b is formed through an injection molding method, an ejecting pin is used for ejecting the LED lens 129b from the mold. Since the ejecting pin pushes the flat second lower surface 166, the LED lens 129b may be easily detached from the mold.

The upper surface 170 is upwardly convex with a first variable curvature and totally reflects the light from the lower surface 160.

The side surface 180 connects the lower surface 160 and the upper surface 170 and the light totally reflected on the upper surface 170 is emitted through the side surface 180. The side surface 180 may have first and second slanting surfaces 182 and 184 extending from an end portion of the upper surface 170 inwardly. The first slanting surface 182 may extend from an end portion of the upper surface 170 with a first slope, and the second slanting surface 184 may extend from the first slanting surface 182 with a second slope smaller than the first slope. The side surface 180 having the first and second slanting surfaces 182 and 184 adjusts the direction of the light totally reflected on the upper surface 170 upward such that the irradiation angle of the LED package 128 is expanded and the light from the LED package 128 is widely diffused.

After the light emitted from the LED 129a enters the LED lens 129b through the lower surface 160, the light is totally reflected on the upper surface 170 and is emitted from the LED lens 129b through the side surface 180 such that the light is uniformly diffused and distributed.

The first central light LT11 and the first stray light LT21 emitted from the LED 129a may enter the lower surface 160 of the LED lens 129b and may be refracted at the lower surface 160 to become a second central light LT12 and a second stray light LT22, respectively. The second central light LT12 and the second stray light LT22 may be totally reflected on the upper surface 170 to become a third central light LT13 and a third stray light LT23, respectively. In addition, the third central light LT13 and the third stray light LT23 may be refracted at the side surface 180 to be emitted through the side surface 180 as a fourth central light LT14 and a fourth stray light LT24, respectively.

The LED lens 129b may further include supporters 190 (of FIG. 10) on the lower surface 160. The supporters 190 may contact an LED printed circuit board (PCB) 129c (of FIG. 10) such that the LED lens 129b is supported by and is fixed to the LED PCB 129c. For example, the supporters 190 may be formed on one of the first and second lower surfaces 164 and 166.

A separation distance D between the LED 129a and the LED lens 129b may be adjusted by adjusting a length of the supporters. The separation distance D may adjust a light deviation between a central portion and a peripheral portion of the LED lens 129b and an optical gap between a reflecting plate 121 (of FIG. 10) and a diffusing plate 124 (of FIG. 10).

The LED lens 129b may be formed of a transparent material such that the light emitted from the LED 129a is widely diffused through refraction and reflection. For example, the LED lens 129b may be formed of one of cyclic olefin copolymer (COC), polymethylmethacrylate (PMMA), polycarbonate (PC), silicon, fluorocarbon polymer, polystyrene (PS) and polyetherimide (PEI) by an injection molding method. The LED lens 129b may have a refractive index within a range of about 1.41 to about 1.66.

Figure 3A:
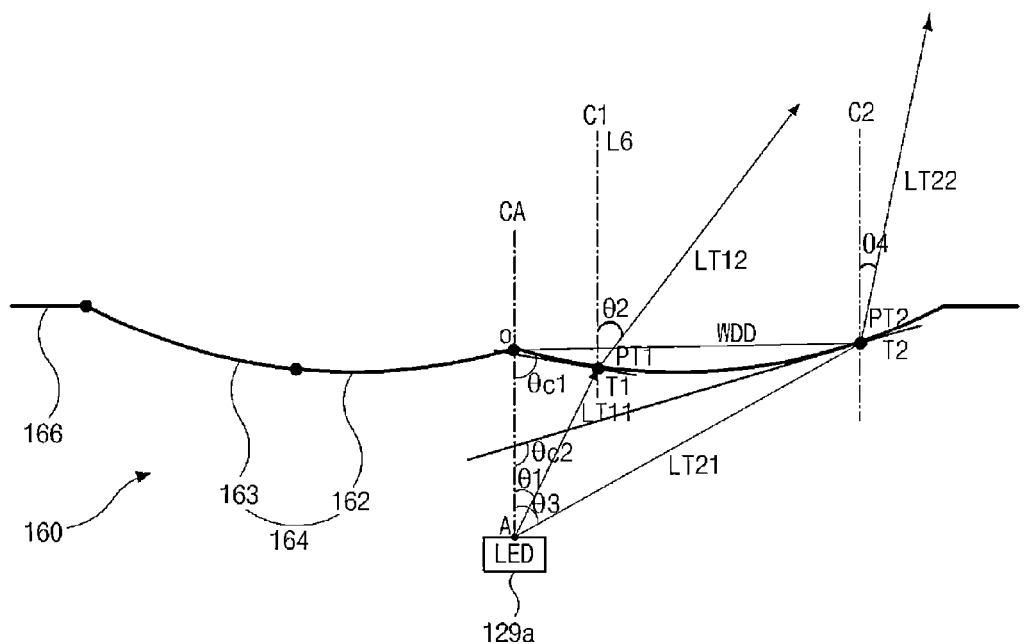
FIG. 3A is a cross-sectional view illustrating a lower surface of a light emitting diode lens of a light emitting diode package according to a first embodiment of the present invention
Figure 3B:
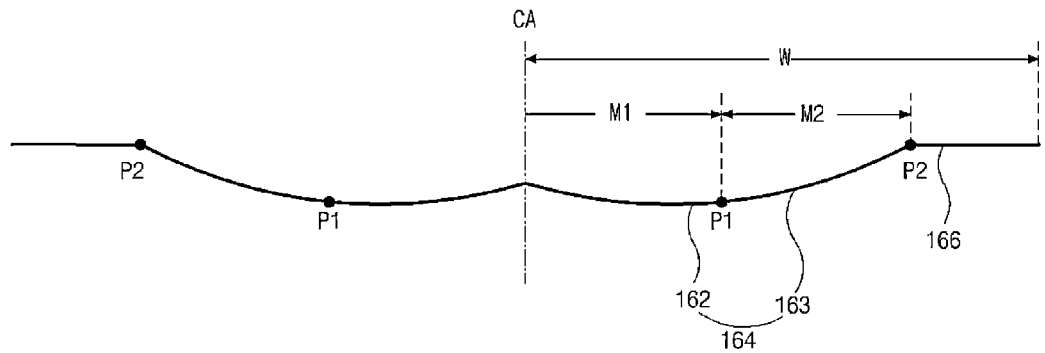
FIG. 3B is a cross-sectional view illustrating a lower surface of a light emitting diode lens of a light emitting diode package according to a first embodiment of the present invention

FIGS. 3A and 3B are cross-sectional views illustrating a lower surface of an LED lens of an LED package according to the first embodiment of the present invention.

In FIG. 3A, the first central light LT11 of high intensity and the first stray light LT21 of low intensity are emitted from a central point A of the LED 129*a*. The LED lens 129*b* (of FIG. 2) includes the lower surface 160. The first central light LT11 may enter the first lower surface 164 through a first point PT1 of the first curved surface 162 and may be refracted to become the second central light LT12. The first stray light LT21 may enter the first lower surface 164 through a second point PT2 of the second curved surface 163 and may be refracted to become the second stray light LT22.

The first central light LT11 may have a first angle θ1 with respect to the central axis CA of the LED lens 129*b*, and the second central light LT12 may have a second angle θ2 with respect to a first axis C1 parallel to the central axis CA. The second angle θ2 may be greater than the first angle θ1. In addition, the first stray light LT21 may have a third angle θ3 with respect to the central axis CA of the LED lens 129*b*, and the second stray light LT22 may have a fourth angle θ4 with respect to a second axis C2 parallel to the central axis CA. The fourth angle θ4 may be smaller than the third angle θ3.

Accordingly, the LED lens 129*b* may change a path of the first central light LT11 of high intensity toward an edge portion of the LED package 128 and may change a path of the first stray light LT21 of low intensity toward a central portion of the LED package 128.

The first curved surface 162 of the first lower surface 164 may refract and more outwardly diffuse the first central light LT11 of high intensity. Since an amount of light emitted from a central portion of the LED lens 129*b* is reduced and the central intensity in the irradiation angle is reduced, the LED package 128 has a uniform light distribution at the central portion and the peripheral portion of the LED lens 129*b*.

In addition, the second curved surface 163 of the first lower surface 164 may refract and less outwardly diffuse the first stray light LT21 of low intensity. Since a width of the upper surface 170 (of FIG. 2) may be reduced by the second curved surface 163, a radius of the LED lens 129*b* and a size of the LED package 128 may be reduced.

A first tangent line T1 at the first point PT1 of the first curved surface 162 may have a first tangent angle θc1 with respect to the central axis CA, and a second tangent line T2 at the second point PT2 of the second curved surface 163 may have a second tangent angle θc2 with respect to the central axis CA. For example, the first tangent angle θc1 may be an acute angle smaller than about 90 degrees, and the second tangent angle θc2 may be an obtuse angle greater than about 90 degrees and smaller than about 180 degrees. As a result, a tangent line of the first and second curved surfaces 162 of the first lower surface 164 may have one of an acute angle, a right angle and an obtuse angle with respect to the central axis CA.

In FIG. 3B, the tangent line of the first curved surface 162 in a first section M1 may have an acute angle with respect to the central axis CA, and the tangent line of the second curved surface 163 in a second section M2 may have an obtuse angle with respect to the central axis CA. The tangent line of the first end portion P1 where the first and second curved surfaces 162 and 163 are connected may have a right angle with respect to the central axis CA. The widths of first and second sections M1 and M2 may be changed by the curvatures of the first and second curved surfaces 162 and 163, and the position of the first end portion P1 may be changed by the curvatures of the first and second curved surfaces 162 and 163.

A width of the second lower surface 166 may be determined according to a radius of the ejecting pin used in the injection molding method. For example, the width of the second lower surface 166 may be equal to or greater than about 2 mm with respect to the radius of the LED lens 129*b*. When the LED 129*a* has an irradiation angle of about 120 degrees and the third angle θ3 is about 60 degrees, which is a half angle of the irradiation angle, the width of the second lower surface 166 may be smaller than a value obtained by subtracting a distance WDD between the second point PT2 and a center point O of the LED lens 129*b* from a radius W of the LED lens 129*b*. Since most of the light is emitted from the LED 129*a* within the irradiation angle, most of the light may enter the LED lens 129*b* through the first lower surface 164.

When the width of the second lower surface 166 is greater than the value obtained by subtracting the distance WDD from the radius W of the LED lens 129*b*, the light emitted from the LED 129*a* may enter the LED lens 129*b* through the second lower surface 166. As a result, the central intensity of the irradiation angle may increase and thus, the uniformity of the light distribution deteriorates.

Figure 4:
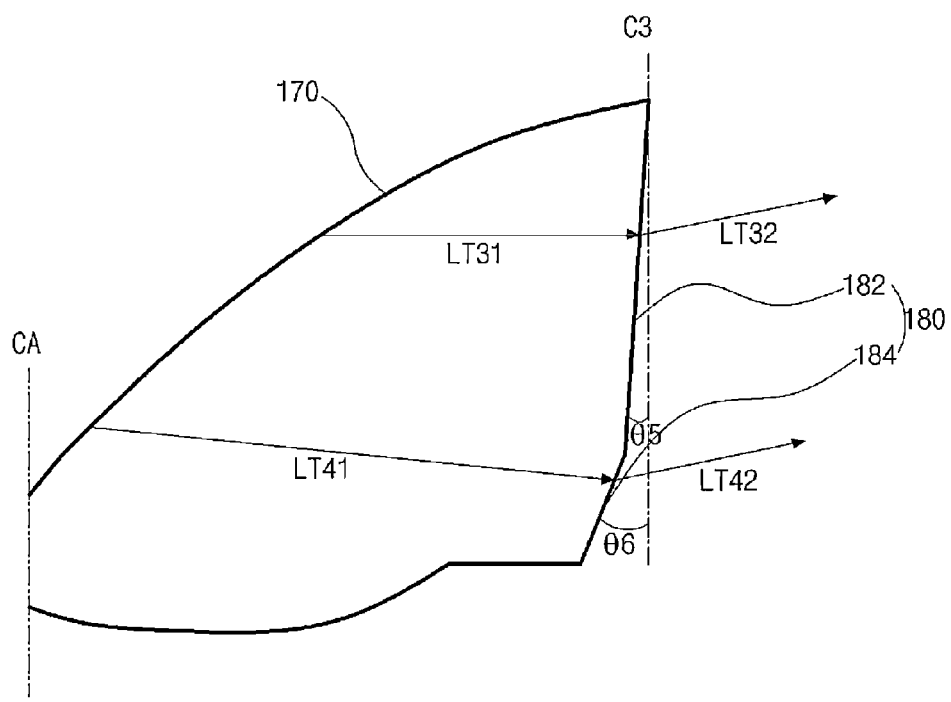
FIG. 4 is a cross-sectional view illustrating a side surface of a light emitting diode lens of a light emitting diode package according to a first embodiment of the present invention.

FIG. 4 is a cross-sectional view illustrating a side surface of an LED lens of an LED package according to the first embodiment of the present invention.

In FIG. 4, the side surface 180 may include the first and second slanting surfaces 182 and 184 having different slopes. The first slanting surface 182 may have a fifth angle θ5 with respect to a third axis C3 parallel to the central axis CA, and the second slanting surface 184 may have a sixth angle θ6 with respect to the third axis C3. The sixth angle θ6 may be greater than the fifth angle θ5. Accordingly, the slope of the second slanting surface 184 may be smaller than the slope of the first slanting surface 182.

A first reflected light LT31 from the upper surface 170 may enter the first slanting surface 182 and may be refracted at the first slanting surface 182 to become a first refracted light LT32. A second reflected light LT41 from the upper surface 170 may enter the second slanting surface 184 and may be refracted at the second slanting surface 184 to become a second refracted light LT42. Since the first and second slanting surfaces 182 and 184 may upwardly change directions of the first and second reflected lights LT31 and LT41, respectively, the light diffusion and the irradiation angle of the LED package 128 are improved. Specifically, since the refracting angle for the second reflected light LT41 at the second slanting surface 184 is greater than the refracting angle for the first reflected light LT31 at the first slanting surface 182, the first and second refracted lights LT32 and LT42 may be diffused more widely and uniformly.

Figure 5A:
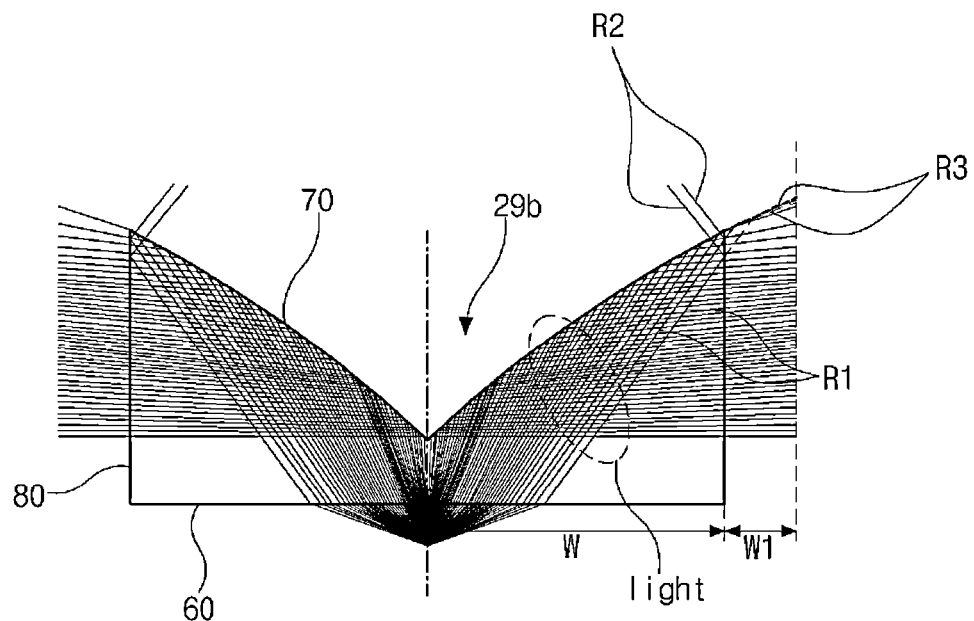
FIG. 5A is a view illustrating a light path through a light emitting diode lens of a light emitting diode package according to the related art.
Figure 5B:
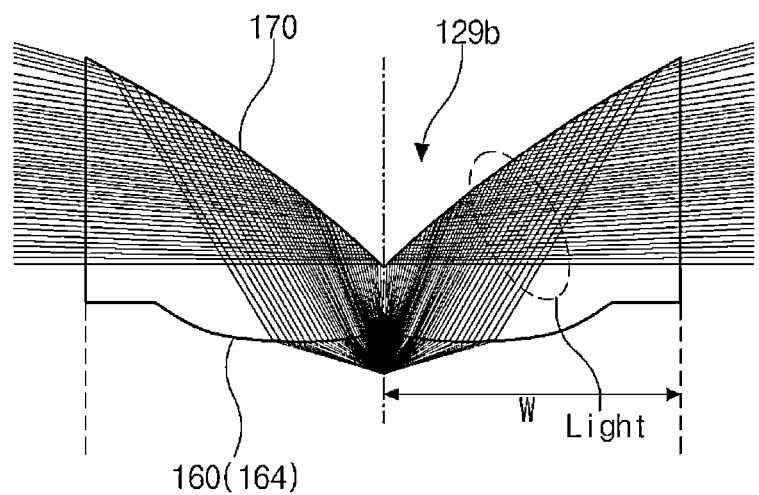
FIG. 5B is a view illustrating a light path through a light emitting diode lens of a light emitting diode package according to a first embodiment of the present invention.

FIG. 5A is a view illustrating a light path through an LED lens of an LED package according to the related art, and FIG. 5B is a view illustrating a light path through an LED lens of an LED package according to the first embodiment of the present invention. The upper and side surfaces of the LED lens 29*b* of FIG. 5A has the same structure as those of the LED lens 129*b* of FIG. 5B. In addition, the LED lens 29*b* of FIG. 5A has the same radius W as that of the LED lens 129*b* of FIG. 5B.

In FIG. 5A, the LED lens 29*b* includes a flat lower surface 60, an upper surface 70 and a side surface 80. The light emitted from the LED (not shown) enters the LED lens 29*b* through the lower surface 60 and is totally reflected on the upper surface 70. However, all the light emitted from the LED is not totally reflected on the upper surface 70. For example, although most rays are totally reflected on the upper surface 70, a first ray R1 is not totally reflected on the upper surface 70. Instead, the first ray R1 is totally reflected on the side surface 80 and is emitted through the upper surface 70 to become a second ray R2 toward a front direction. As a result, the light emitted from the LED is not uniformly diffused and concentrated on the central portion.

For the first ray R1 to be totally reflected by the upper surface 70, the radius W of the LED lens 29b should be expanded by a first width W1 so that the first ray R1 can be totally reflected on the upper surface 70 and can be emitted through the side surface 80 to become a third ray R3. However, the size of the LED lens 29b increases by the first width W1.

In FIG. 5B, the LED lens 129b includes the lower surface 160 of the first and second lower surfaces 164 and 166 (of FIG. 2), the upper surface 170 and the side surface 180. Since a light path is adjusted by the first and second lower surfaces 164 and 166, substantially all the light emitted from the LED 129a (of FIG. 2) is totally reflected on the upper surface 170 even when the LED lens 129b has the radius W.

Although the LED lens 29b of FIG. 5A has an expanded radius (W+W1) for the first ray R1 to be reflected by an edge portion of the upper surface 70, the LED lens 129b of FIG. 5B has the radius W. This is because the ray of the edge portion is less outwardly refracted by the second curved surface 163 (of FIG. 2) of the first lower surface 164. Since the light path is adjusted by the lower surface 160 of the LED lens 129b, the irradiation angle increases and the size of the LED package 128 can be reduced.

Figure 6:
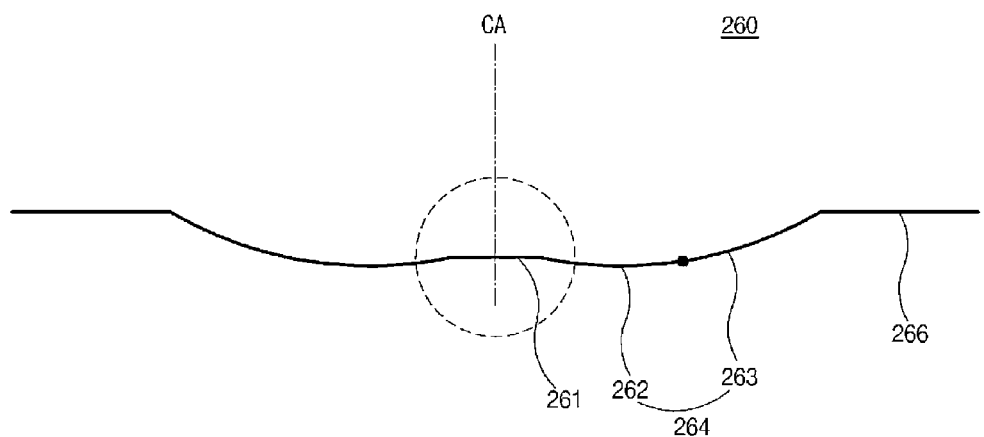
FIG. 6 is a cross-sectional view illustrating a lower surface of a light emitting diode lens of a light emitting diode package according to the second embodiment of the present invention.

FIG. 6 is a cross-sectional view illustrating a lower surface of an LED lens of a LED package according to the second embodiment of the present invention. The LED lens 260 of the second embodiment has the same structure as the LED lens 129b of the first embodiment except for the shape of the central portion of the lower surface.

In FIG. 6, a lower surface 260 further includes a plane surface at a central portion thereof. Accordingly, the lower surface 260 may include a first lower surface 264, a second lower surface 266 and a third lower surface 261. The first lower surface 264 extending from the third lower surface 261 may include first and second curved surfaces 262 and 263. The second lower surface 266 extending from the first lower surface 264 may be flat. The third lower surface 261 disposed at the central portion of the LED lens may be flat. The third lower surface 261 may have a width smaller than the second lower surface 266. For example, the width of the third lower surface 261 may be equal to or smaller than about 1 mm with respect to the radius of the LED lens.

Since the lower surface 260 of the LED lens of FIG. 6 has the flat third lower surface 261 at the central portion thereof, the LED lens may be extracted from a mold for an injection molding method.

Figure 7A:
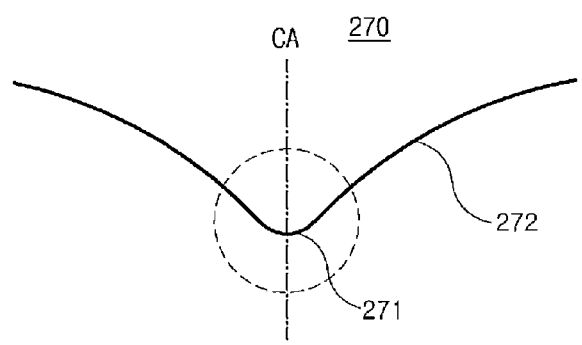
FIG. 7A is a cross-sectional view illustrating an upper surface of a light emitting diode lens of a light emitting diode package according to the third embodiment of the present invention.
Figure 7B:
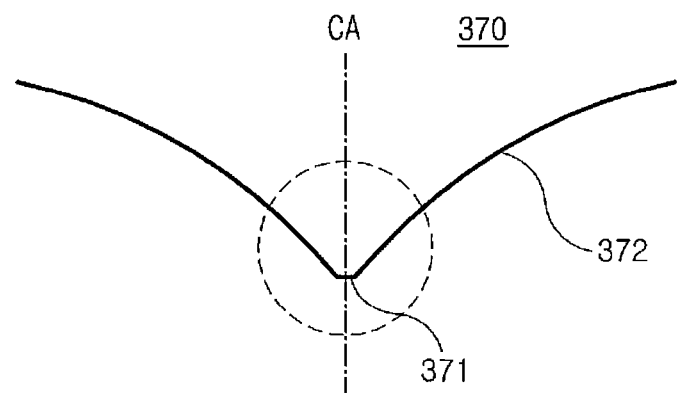
FIG. 7B is a cross-sectional view illustrating an upper surface of a light emitting diode lens of a light emitting diode package according to the fourth embodiment of the present invention.
Figure 7C:
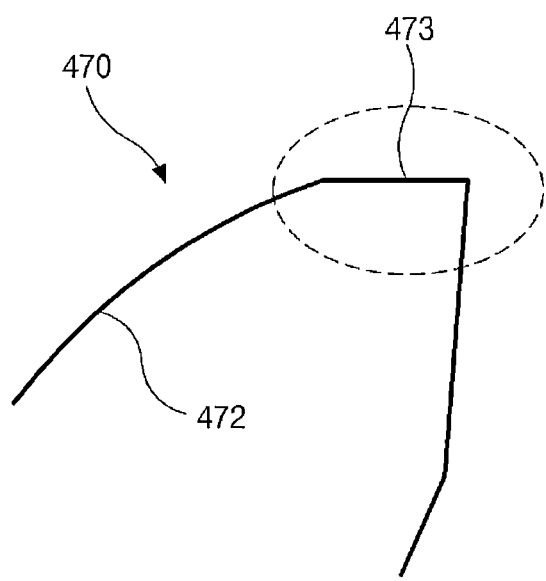
FIG. 7C is a cross-sectional view illustrating an upper surface of a light emitting diode lens of a light emitting diode package according to the fifth embodiment of the present invention.
Figure 8:
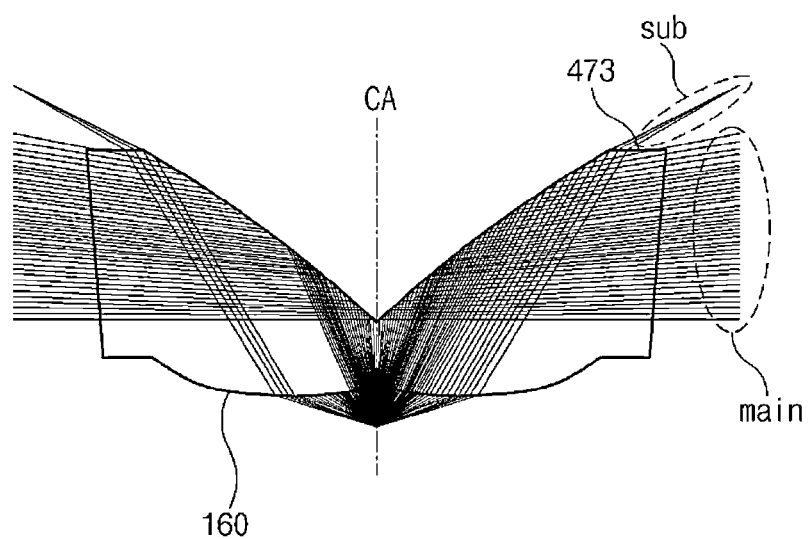
FIG. 8 is a view illustrating a light path through a light emitting diode lens of FIG. 7C.

FIGS. 7A, 7B and 7C are cross-sectional views illustrating an upper surface of an LED lens of an LED package according to the third, fourth and fifth embodiments of the present invention, respectively. FIG. 8 is a view illustrating a light path through an LED lens of FIG. 7C.

An upper surface 270 of an LED lens includes a concave curved surface 271 at a central portion thereof as a central surface in FIG. 7A, and an upper surface 370 of an LED lens includes a plane surface 371 at a central portion thereof as a central surface in FIG. 7B. When the concave curved surface 271 or the plane surface 371 is disposed at the central portion of the upper surface 270 or 370, some of the light emitted from an LED (not shown) passes through the concave curved surface 271 or the plane surface 371 toward a front direction. As a result, an amount of light emitted from the central portion of the LED lens increases. In other words, when an amount of light emitted from the central portion is lower than an amount of light emitted from the peripheral portion in the LED package, the amount of light emitted from the central portion may be increased by forming the concave curved surface 271 or the plane surface 371 at the central portion of the LED lens. Accordingly, a light distribution of the LED package may be obtained by reducing the light deviation between the central portion and the peripheral portion.

In addition, the cooling time of the injection molding method may be reduced by forming the concave curved surface 271 or the plane surface 371 at the central portion of the LED lens. Since the mold used for the injection molding method is simplified due to the concave curved surface 271 or the plane surface 371 at the central portion of the LED lens, the cooling efficiency and accuracy of the injection molding method may be improved. For example, the width of the concave curved surface 271 or the plane surface 371 may be smaller than about 0.3 mm with respect to the diameter of the LED lens.

In FIGS. 7C and 8, an upper surface 470 includes a first upper surface 472 and a second plane surface 473 at an edge portion thereof as an edge surface. Some of the light incident on the lower surface may enter the second plane surface 473 and may be refracted at the second plane surface 473 to be emitted through the second plane surface 473. Most rays "main" of the light from the LED exit the LED lens with a first irradiation angle, while some rays "sub" of the light from the LED exit the LED lens with a second irradiation angle smaller than the first irradiation angle. As a result, light deviation may be adjusted.

When the LED lens has a radius (W), the second plane surface 473 of the upper surface 470 may have a width equal to or smaller than a quarter (¼W) of the radius (W). Since most rays of the light are totally reflected on the first upper surface 472 and some rays of the light are emitted through the second plane surface 473, the light deviation between the central portion and the peripheral portion of the LED lens is reduced and the light uniformity is improved.

Figure 9:
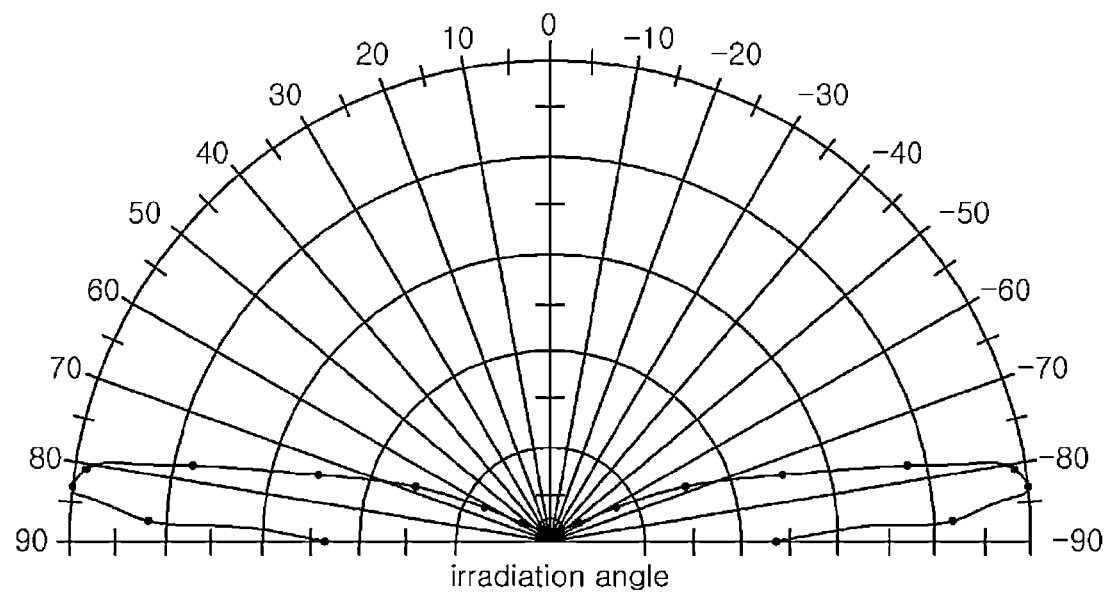
FIG. 9 is a view showing an irradiation angle of a light emitting diode package according to the first embodiment of the present invention.

FIG. 9 is a view illustrating an irradiation angle of an LED package according to the first embodiment of the present invention.

In FIG. 9, the irradiation angle of the LED package 128 (of FIG. 2) is expanded over about 165 degrees by diffusing the light from the LED 129a (of FIG. 2) through the LED lens 129b (of FIG. 2).

Figure 10:
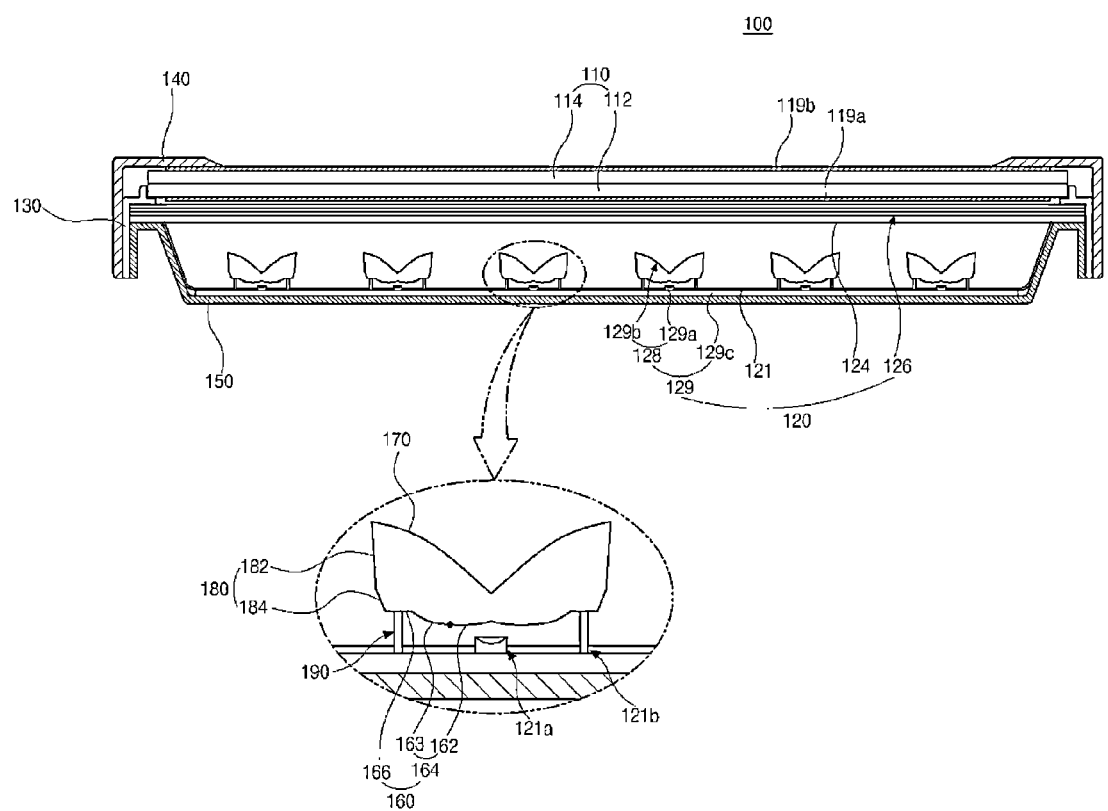
FIG. 10 is a cross-sectional view illustrating a liquid crystal display device including a light emitting diode package according to the first embodiment of the present invention.

FIG. 10 is a cross-sectional view illustrating a liquid crystal display (LCD) device including an LED package according to the first embodiment of the present invention.

In FIG. 10, an LCD device 100 includes a liquid crystal panel 110, a backlight unit 120, a main frame 130, a top frame 140 and a bottom frame 150. The liquid crystal panel 110 may include first and second substrates 112 and 114 and a liquid crystal layer (not shown) between the first and second substrates 112 and 114 to display an image. The first substrate 112 may be referred to as a lower substrate or an array substrate, and the second substrate 114 may be referred to as an upper substrate or a color filter substrate.

Although not shown, a gate line and a data line, which cross each other to define a pixel region, may be formed on an inner surface of the first substrate 112, and a thin film transistor (TFT) connected to the gate line and the data line may be formed in the pixel region. A pixel electrode connected to the TFT may be formed in the pixel region.

A black matrix corresponding to the gate line, the data line and the TFT may be formed on an inner surface of the second substrate 114, and a color filter layer including red, green and blue color filters may be formed on the black matrix. A common electrode may be formed on the color filter layer.

In addition, first and second polarizing plates 119a and 119b, where a predetermined polarization component selectively passes, are formed on outer surfaces of the first and second substrates 112 and 114, respectively.

A printed circuit board (PCB) may be connected to at least one side of the liquid crystal panel 110 through a connection unit such as a flexible printed circuit (FPC) or a tape carrier package (TCP). The PCB may be fold and disposed on a side surface of the main frame 130 or a rear surface of the bottom frame 150 during a modularization step.

When the TFT is turned on according to a gate signal from a gate driving unit, a data signal of a data driving unit is applied to the pixel electrode. Liquid crystal molecules of the liquid crystal layer are realigned according to an electric field generated between the pixel electrode and the common electrode to generate difference in transmittance.

The backlight unit 120 under the liquid crystal panel 110 supplies a light to the liquid crystal panel 110 to display an image according to the difference in transmittance. The backlight unit 120 may include a plurality of LED assemblies 129, a reflecting plate 121 on the plurality of LED assemblies 129, a diffusing plate 124 over the reflecting plate 121 and a plurality of optical sheets 126 over the diffusing plate 124.

Each of the plurality of LED assemblies 129 may include an LED PCB 129c, a plurality of LEDs 129a spaced apart from each other on the LED PCB 129c and an LED lens 129b on each LED 129a. The LED 129a and the LED lens 129b constitute an LED package 128.

The light emitted from the plurality of LEDs 129a is widely and uniformly diffused in the LED lens 129b by refraction and total reflection. Specifically, since the irradiation angle of the LED package 128 is equal to or greater than about 165 degrees, a uniform light distribution is obtained even when a separation distance between the adjacent LEDs 129a increases and/or a number of the plurality of LEDs 129a decreases. In addition, a uniform light distribution is obtained even when a separation distance between the adjacent LED assembly 129 increases.

The plurality of LED assemblies 129 are disposed on the bottom frame 150 to be spaced apart and parallel to each other. Since the LED package 128 has a wide irradiation angle due to characteristics of the LED lens 129b, the separation distance between the adjacent LED assemblies 129 as well as the separation distance between the adjacent LEDs 129a can be increased and/or the number of the plurality of LEDs 129a can be reduced. The plurality of LED assemblies 129 may be disposed along a longitudinal direction of the bottom frame 150 or along a direction perpendicular to the longitudinal direction of the bottom frame 150.

The LED PCB 129c may be a metal core printed circuit board (MCPCB) for radiating heat. In addition, a radiator may be formed on a rear surface of the LED PCB 129c to radiate the heat generated from the plurality of LEDs 129a to exterior.

The reflecting plate 121 having a plurality of first through holes 121a is disposed over the LED PCB 129c to reflect the light from the plurality of LEDs 129a to the bottom frame 150 toward the liquid crystal panel 110. The plurality of LEDs 129a penetrate the plurality of first through holes 121a to be exposed over the reflecting plate 121, and the reflecting plate 121 is disposed over the LED PCB 129c. The reflecting plate 121 may have a plurality of second through holes 121b corresponding to the supporter 190 of the LED lens 129b. The reflecting plate 121 may be a plate having a white or silver color.

The diffusing plate 124 is disposed over the reflecting plate 121. The diffusing plate 124 may be separated from the reflecting plate 121 by an optical gap. The optical gap is provided for obtaining a uniform light by diffusing the light emitted from the plurality of LEDs 129a. Since the LED lens 129b having a wide irradiation angle is formed on each of the plurality of LEDs 129a, the optical gap between the reflecting plate 121 and the diffusing plate 124 may be reduced and a thickness of the LCD device 100 may also be reduced.

The plurality of optical sheets 126 are disposed over the diffusing plate 124. The plurality of optical sheets 126 may include a diffusing sheet and at least one collimating sheet. In addition, the plurality of optical sheets 126 may include a functional sheet such as a dual brightness enhancement film (DBEF) to improve brightness of the light emitted from the plurality of LEDs 129a.

The light emitted from the LED package 128 is supplied to the liquid crystal panel 110 through the reflecting plate 121, the diffusing plate 124 and the plurality of optical sheets 126, and the liquid crystal panel 110 displays an image of a high brightness using the light.

The liquid crystal panel 110 and the backlight unit 120 are modularized by the main frame 130, the top frame 140 and the bottom frame 150. The top frame 140 has a rectangular ring shape to cover a front edge surface and a side surface of the liquid crystal panel 110. The liquid crystal panel 110 displays an image through an opening of the top frame 140. The bottom frame 150 has a plate shape to support the backlight unit 120 and the liquid crystal panel 110. The bottom frame 150 may include a pair of side supporters (not shown) each having a bar shape and connected to two opposite sides of the bottom frame 150. The other two opposite sides of the bottom frame 150 may be bent to provide a space for the backlight unit 120. In addition, the main frame 130 has a rectangular ring shape to cover the side surface of the liquid crystal panel 110 and the backlight unit 120 and to be combined with the top frame 140 and the bottom frame 150.

The top frame 140 may be referred to as a top cover, a case top or a top case. The main frame may be referred to as a support main, a guide panel, a main supporter or a mold frame, and the bottom frame may be referred to as a cover bottom or a bottom cover.

Figure 11A:
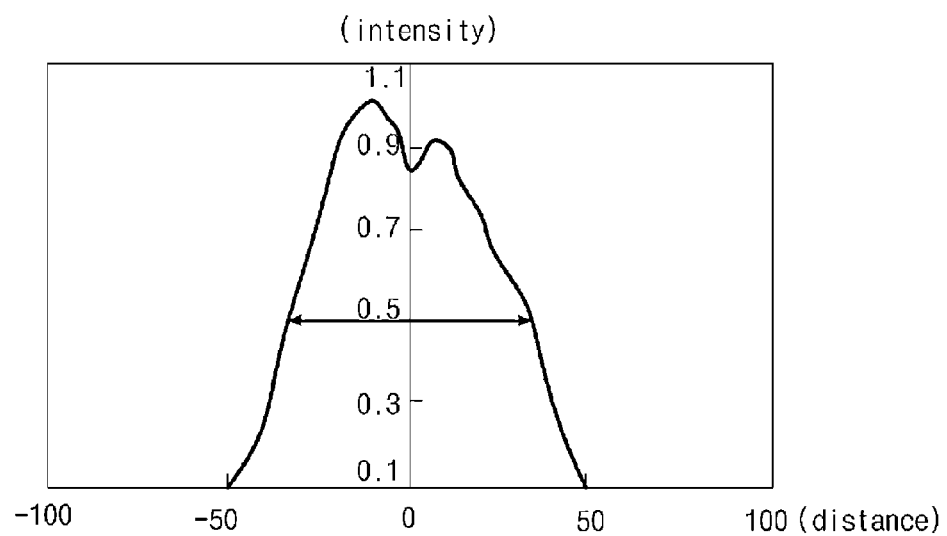
FIG. 11A is a view showing a light coverage region of a backlight unit including a light emitting diode package according to the related art.
Figure 11B:
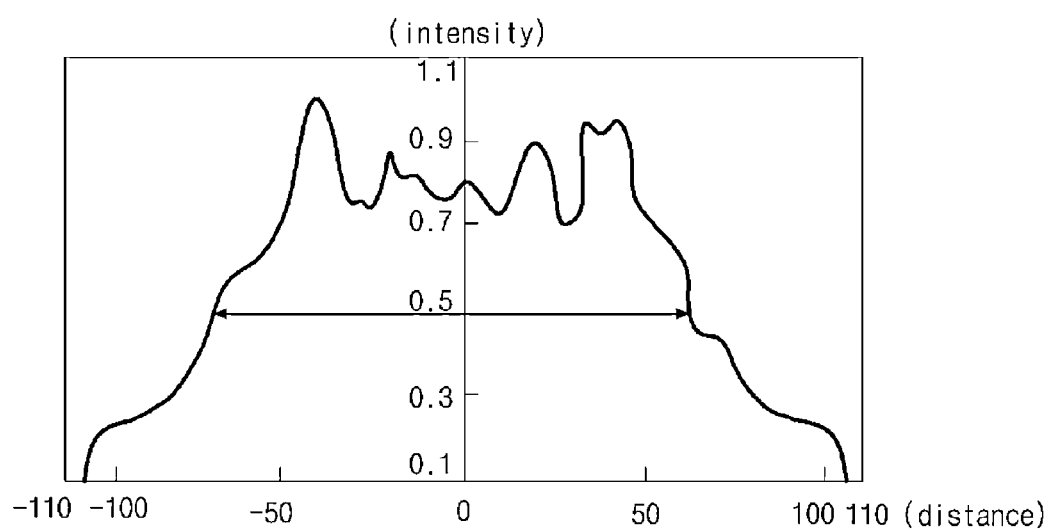
FIG. 11B is a view showing a light coverage region of a backlight unit including a light emitting diode package according to the first embodiment of the present invention.

FIG. 11A is a view showing a light coverage region of a backlight unit including an LED package according to the related art, and FIG. 11B is a view showing a light coverage region of a backlight unit including an LED package according to the first embodiment of the present invention. The backlight units of FIGS. 11A and 11B have an optical gap of about 15 mm, and the light coverage regions of FIGS. 11A and 11B are compared with respect to a distance at a half maximum intensity, which is 50% of a maximum intensity.

In FIG. 11A, the light is distributed from a distance of about −50 to a distance of about 50, and the points of the half maximum intensity (0.5) are disposed at a distance of about −30 and a distance of about 30. In FIG. 11B, the light is distributed from a distance of about −105 to a distance of about 110, and the points of the half maximum intensity (0.5) are disposed at a distance of about −65 and a distance of about 60. The width between the points of the half maximum intensity (0.5) of the backlight unit of FIG. 11A is about 60, and the width between the points of the half maximum intensity (0.5) of the backlight unit of FIG. 11B is about 125. When the backlight unit of FIG. 11A has the light coverage region of about 100%, the backlight unit of FIG. 11B has the light coverage region of about 210%.

Accordingly, the backlight unit of FIG. 11B has a wider light coverage region and thus a uniform light distribution as compared with the backlight unit of FIG. 11A.

Figure 12:
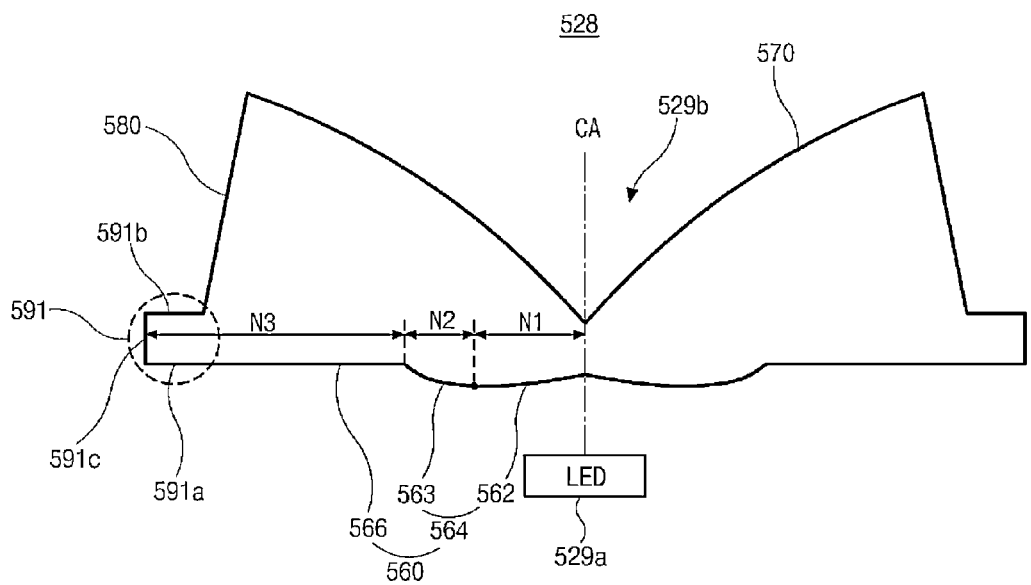
FIG. 12 is a cross-sectional view illustrating a light emitting diode package according to the sixth embodiment of the present invention.
Figure 13:
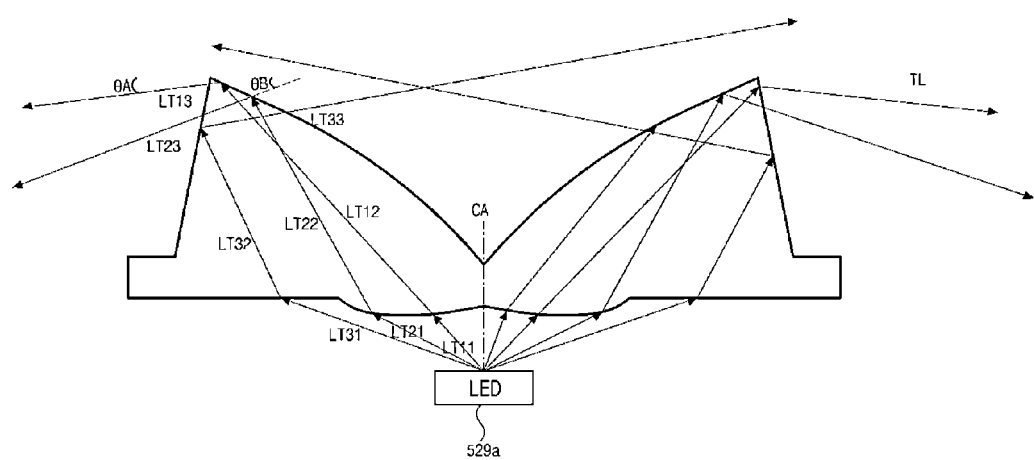
FIG. 13 is a cross-sectional view illustrating a light path through a light emitting diode package of FIG. 12.

FIG. 12 is a cross-sectional view illustrating an LED package according to the sixth embodiment of the present invention, and FIG. 13 is a cross-sectional view illustrating a light path through an LED package of FIG. 12.

In FIG. 12, an LED package 528 includes an LED 529a and an LED lens 529b. The LED lens 529b includes a lower surface 560, an upper surface 570 and a side surface 580 connecting the lower surface 560 and the upper surface 570. In addition, the LED lens 529b may have a symmetrical shape with respective to a central axis CA. The lower surface 560, the upper surface 570 and the side surface 580 may be referred to as an incident surface, a reflecting surface and an emitting surface, respectively. Further, the LED lens 129b may have a circular shape having a concave central portion.

The lower surface 560 which the light emitted from the LED 529a enters may have first and second lower surfaces 564 and 566. The first lower surface 564 includes a first curved surface 562 extending from the central axis CA and a second curved surface 563 extending from a first end portion of the first curved surface 562. The first curved surface 562 is downwardly convex with a first curvature, and the second curved surface 563 is downwardly convex with a second curvature. The first and second curvatures may be the same or different from each other. For example, the second curvature may be equal to or greater than the first curvature.

The first curved surface 562 adjacent to the central axis CA may refract and more outwardly diffuse a first central light of high intensity emitted from the LED 529a, and the second curved surface 563 separated from the central axis CA may refract and less outwardly diffuse a first stray light of low intensity emitted from the LED 529a. The first curved surface 562 may have a first width N1, and the second curved surface 563 may have a second width N2 equal to or smaller than the first width N1.

The second lower surface 566 extends flat from a second end portion of the second curved surface 563 of the first lower surface 564. The second lower surface 566 may have a third width N3 equal to or greater than a sum (N1+N2) of the first and second widths N1 and N2 of the first and second curved surfaces 562 and 563. The peripheral intensity of the LED package 528 increases by expanding the second lower surface 566 as compared with the LED package 128 (of FIG. 2). In addition, the second lower surface 566 may be a plane surface for easily extracting the LED lens 529b from a mold for an injection molding method.

The upper surface 570 is upwardly convex with a third curvature and totally reflects the light through the first lower surface 564. The third curvature may be a variable curvature.

The side surface 580 connects the lower surface 560 and the upper surface 570, and may have a slanting surface extending from an end portion of the upper surface 570. The light reflected on the upper surface 570 is emitted through the side surface 580 to expand the irradiation angle. In addition, the light through the second lower surface 566 is totally reflected on the side surface 580, and is emitted through the upper surface 570 to diffuse the light widely.

A protrusion 591 is formed between the lower surface 560 and the side surface 580. Supporters 590 (of FIG. 15) for supporting the LED lens 529b may be formed on the protrusion 591. In addition, an ejecting pin of the injection molding method may push the protrusion 591 so that the LED lens 529b can be easily detached from a mold. The protrusion 591 may include a first surface 591a connected to an end portion of the second lower surface 566, a second surface 591b opposite to the first surface 591a and a third surface 591c connecting the first and second surfaces 591a and 591b. The protrusion 591 may have a rectangular shape or a half circular shape in a cross-sectional view.

When the LED lens 529b is formed through an injection molding method, an ejecting pin is used for ejecting the LED lens 529b from a mold. Since the ejecting pin pushes the protrusion 591, the LED lens 529b may be easily detached from the mold. The protrusion 591 may be omitted in another embodiment. When the protrusion 591 is omitted, the side surface 580 may extend to be connected to the second lower surface 566.

After a portion of the light emitted from the LED 529a enters the LED lens 529b through the first lower surface 564, the portion of the light is totally reflected on the upper surface 570 and is emitted through the side surface 580. In addition, after the other portion of the light emitted from the LED 529a enters the LED lens 529b through the second lower surface 566, the other portion of the light is totally reflected on the side surface 580 and is emitted through the upper surface 570. Accordingly, the light emitted through the upper surface 570 and the side surface 580 is diffused more widely and uniformly.

In FIG. 13, a first central light LT11 emitted from the LED 529a may enter the LED lens 529b through the first curved surface 562 of the first lower surface 564, and may be refracted at the first curved surface 562 to become a second central light LT12. The second central light LT12 may be totally reflected on the upper surface 570 to become a third central light LT13, and the third central light LT13 may be emitted through the side surface 580. A first stray light LT21 emitted from the LED 529a may enter the LED lens 529b through the second curved surface 563 of the first lower surface 564, and may be refracted at the second curved surface 563 to become a second stray light LT22. The second stray light LT22 may be totally reflected on the upper surface 570 to become a third stray light LT23, and the third stray light LT23 may be emitted through the side surface 580.

A tangent line TL may be defined as a line contacting two apexes of the upper surface 570 and perpendicular to the central axis CA. The second central light LT13 may have a first angle θA with respect to the tangent line TL and the second stray light LT23 may have a second angle θB with respect to the tangent line TL. The angle of the first central light LT11 with respect to the central axis CA is smaller than the angle of the second central light LT12 with respect to the central axis CA. In addition, the angle of the first stray light LT21 with respect to the central axis CA is greater than the angle of the second stray light LT22 with respect to the central axis CA. Accordingly, the second angle θB may be greater than the first angle θA. Since the light passing through the first curved surface 562 and totally reflected on the upper surface 570 is further diffused as compared with the light passing through the second curved surface 563 and totally reflected on the upper surface 570, the irradiation angle is expanded.

A first peripheral light LT31 emitted from the LED 529a may enter the LED lens 529b through the second lower surface 566, and may be refracted at the second lower surface 566 to become a second peripheral light LT32. The angle of the first peripheral light LT31 with respect to the central axis CA is greater than the angle of the second peripheral light LT32 with respect to the central axis CA. The second peripheral light LT32 may be totally reflected on the side surface 580 to become a third peripheral light LT33, and the third peripheral light LT33 may be emitted through the upper surface 570. Accordingly, the light intensity at the front peripheral portion of the LED lens 529b increases.

Figure 14A:
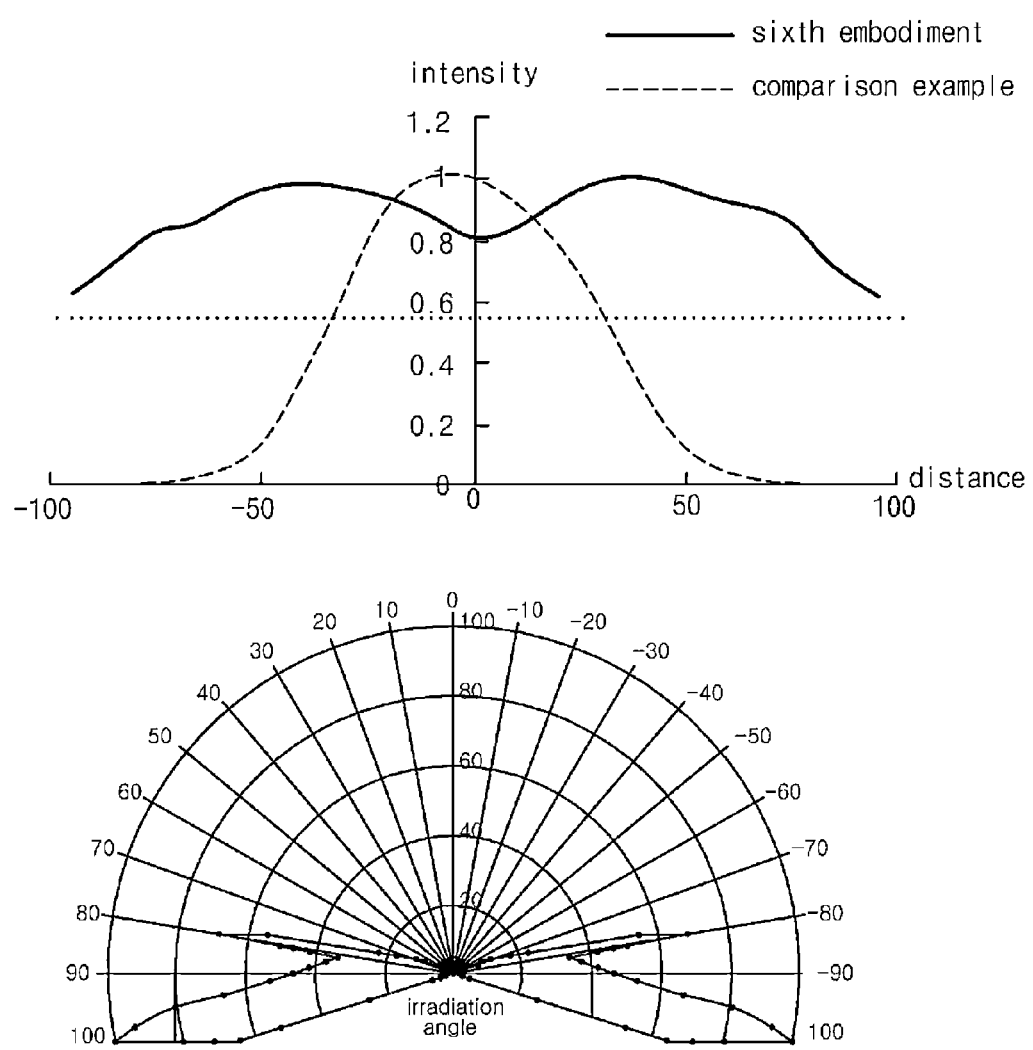
FIG. 14A is a view showing a light coverage region of a backlight unit including a light emitting diode package and an irradiation angle of a light emitting diode package according to the sixth embodiment of the present invention.
Figure 14B:
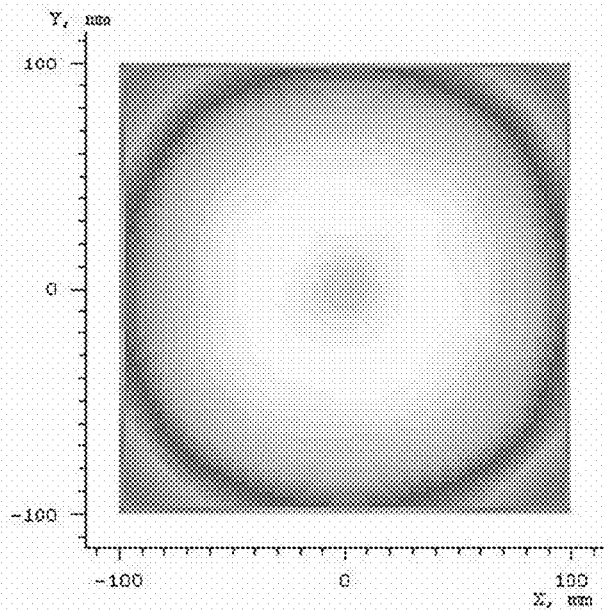
FIG. 14B is a view showing an illuminance of a light emitting diode package according to the sixth embodiment of the present invention.

FIG. 14A is a view showing a light coverage region of a backlight unit including an LED package and an irradiation angle of an LED package according to the sixth embodiment of the present invention, and FIG. 14B is a view showing an illuminance of an LED package according to the sixth embodiment of the present invention. In FIG. 14A, a backlight unit of a comparison example is the backlight unit according to the related art. In addition, the backlight units of FIG. 14A have an optical gap of about 15 mm, and the light coverage regions of FIG. 14A are compared with respect to a distance at a half maximum intensity, which is 50% of a maximum intensity.

In FIG. 14A, the light of the backlight unit of the comparison example is distributed from a distance of about −75 to a distance of about 70, and the points of the half maximum intensity (0.5) are disposed at a distance of about −35 and a distance of about 35. The points of the half maximum intensity (0.5) of the light of the backlight unit according to the sixth embodiment are disposed at a distance of about −100 and a distance of about 100. The width between the points of the half maximum intensity (0.5) of the backlight unit of the comparison example is about 70, and the width between the points of the half maximum intensity (0.5) of the backlight unit according to the sixth embodiment is about 200. When the backlight unit of the comparison example has the light coverage region of about 100%, the backlight unit according to the sixth embodiment has the light coverage region of about 290%. Accordingly, the backlight unit according to the sixth embodiment has a wider light coverage region and the LED package according to the sixth embodiment has a wider irradiation angle and a uniform light distribution as compared with the backlight unit of the comparison example.

In FIG. 14B, the LED package has a wide irradiation area where the light is distributed uniformly and symmetrically along X and Y axes.

Figure 15:
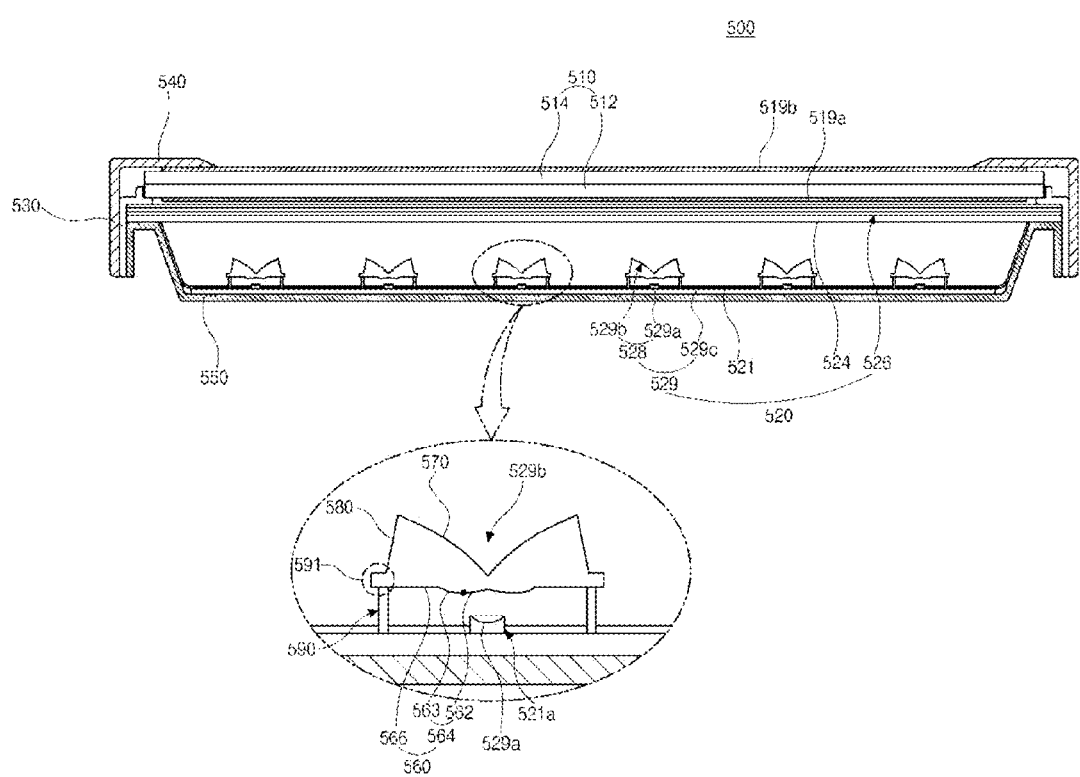
FIG. 15 is a cross-sectional view illustrating a liquid crystal display device including a light emitting diode package according to the sixth embodiment of the present invention.

FIG. 15 is a cross-sectional view illustrating an LCD device including an LED package according to the sixth embodiment of the present invention. The LCD device of FIG. 15 has the same structure as the LCD device of FIG. 10 except for the shape of the LED lens.

In FIG. 15, an LCD device 500 includes a liquid crystal panel 510, a backlight unit 520, a main frame 530, a top frame 540 and a bottom frame 550. The liquid crystal panel 510 and the backlight unit 520 are modularized by the main frame 530, the top frame 540 and the bottom frame 550.

The backlight unit 520 under the liquid crystal panel 510 may include a plurality of LED assemblies 529, a reflecting plate 521 on the plurality of LED assemblies 529, a diffusing plate 524 over the reflecting plate 521 and a plurality of optical sheets 526 over the diffusing plate 524.

Each of the plurality of LED assemblies 529 may include an LED PCB 529c, a plurality of LEDs 529a spaced apart from each other on the LED PCB 529c and an LED lens 529b on each LED 529a. The LED 529a and the LED lens 529b constitute an LED package 528.

The LED lens 529b having a symmetrical shape with respect to a central axis includes the lower surface 560, the upper surface 570 and the side surface 580 connecting the lower surface 560 and the upper surface 570. The lower surface 560 includes the first and second lower surfaces 564 and 566, and the first lower surface 564 includes the first and second curved surfaces 562 and 563. The light through the first lower surface 564 is totally reflected on the upper surface 570 and is emitted through the side surface 580. In addition, the light through the second lower surface 566 is totally reflected on the side surface 580 and is emitted through the upper surface 570.

Specifically, the side surface 580 has a slanting surface extending from the end portion of the upper surface 570 outwardly. In addition, a portion of the light from the LED 529a is transmitted through the side surface 580 and the other portion of the light from the LED 529a is totally reflected on the side surface 580.

Further, the protrusion 591 is formed at a connecting portion of the lower surface 560 and the side surface 580. Supporters 590, which contact an LED printed circuit board (PCB) 526c such that the LED lens 529b is supported by and is fixed to the LED PCB 529c, may be formed on the protrusion 591. Since the supporters 590 are disposed at end portions of the second lower surface 566, the interference by the supporters 590 on the light from the LED 529a to the lower surface 560 may be reduced or prevented. In addition, an ejecting pin of the injection molding method may push the protrusion 591 so that the LED lens 529b can be easily detached from a mold.

The light emitted from the plurality of LEDs 529a is widely and uniformly diffused in the LED lens 529b by refraction and total reflection. Specifically, since the irradiation angle of the LED package 528 is equal to or greater than about 165 degrees, a uniform light distribution is obtained even when a separation distance between the adjacent LEDs 529a increases and/or a number of the plurality of LEDs 529a decreases. In addition, a uniform light distribution is obtained even when a separation distance between the adjacent LED assembly 529 increases.

TABLE 1 shows characteristics of an LED package according to the sixth embodiment of the present invention. In TABLE 1, an LED package of a comparison example may be the LED package according to the related art.

TABLE 1

|  |  | comparison example | sixth embodiment |
|---|---|---|---|
| lens type |  | refractive | reflective |
| irradiation angle |  | 147 degree | 165 degree |
| optical gap (OG) |  | 25 mm | 15 mm |
| number of LEDs | 32 inch | 22 ea | 14 ea |
|  | 47 inch | 54 ea | 36 ea |

In TABLE 1, the optical gap (OG) between the reflecting plate 521 and the diffusing plate 524 of the backlight unit according to the sixth embodiment is reduced to about 15 mm as compared with the backlight unit of the comparison example. In addition, the number of the LEDs of the backlight unit according to the sixth embodiment is reduced as compared with the backlight unit of the comparison example. For example, while the backlight unit of the comparison example for 32 inch LCD device includes 22 LEDs, the backlight unit according to the sixth embodiment for 32 inch LCD device includes 14 LEDs. Since the optical gap and the number of LEDs are reduced, the whole thickness of the LCD device is reduced. Accordingly, parts cost and fabrication cost can be reduced.

Figure 16A:
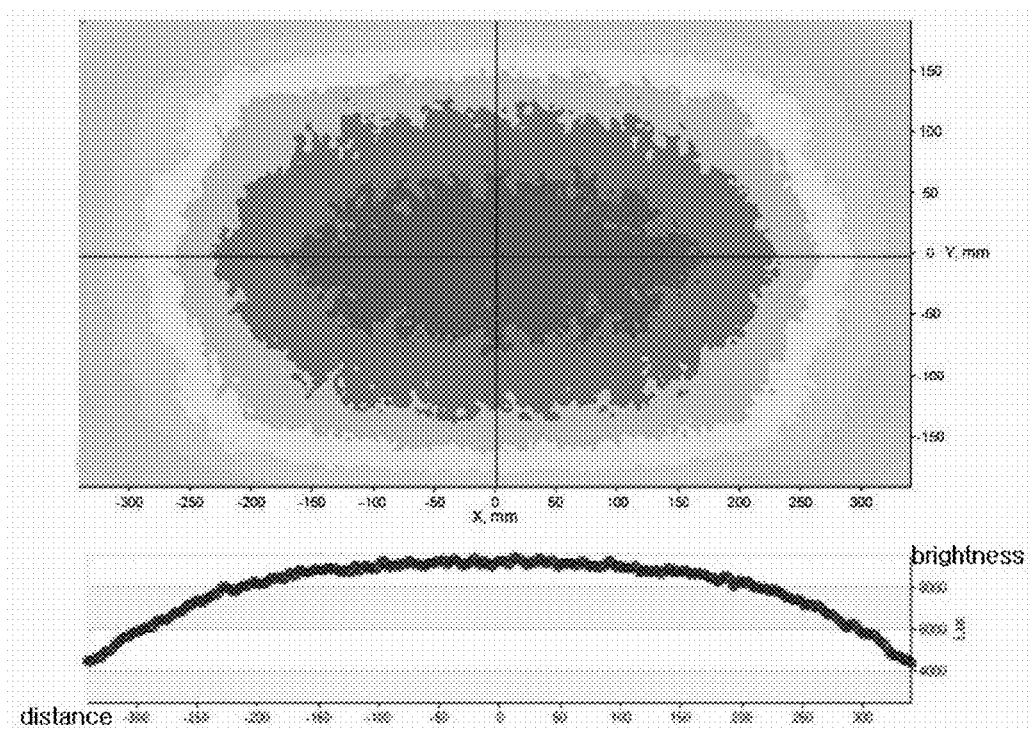
FIG. 16A is a view showing a light coverage region of a liquid crystal display device including a light emitting diode package according to the sixth embodiment of the present invention.
Figure 16B:
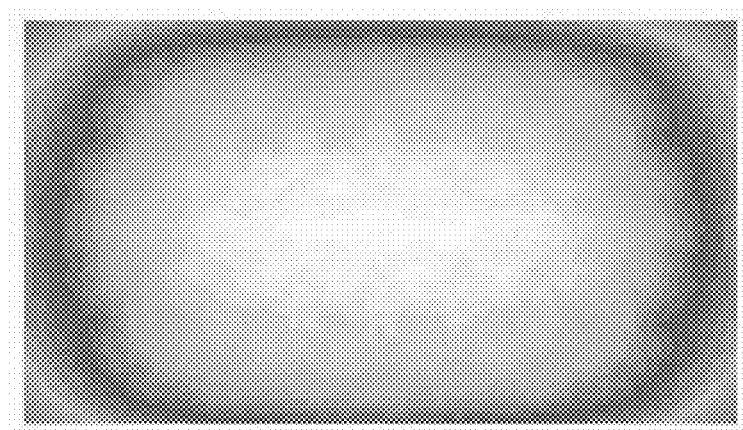
FIG. 16B is a view showing a light distribution of a liquid crystal display device including a light emitting diode package according to the sixth embodiment of the present invention.
Figure 16C:
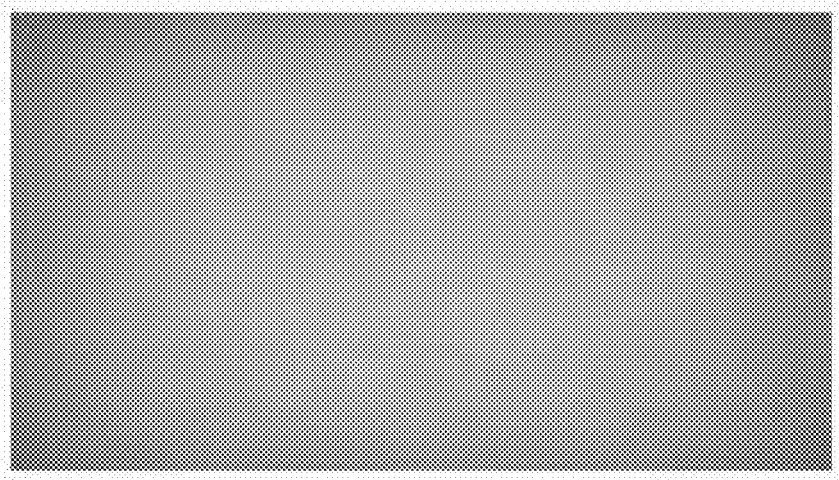
FIG. 16C is a view showing a color uniformity of a liquid crystal display device including a light emitting diode package according to the sixth embodiment of the present invention.

FIG. 16A is a view showing a light coverage region of an LCD device including an LED package according to the sixth embodiment of the present invention, FIG. 16B is a view showing a light distribution of an LCD device including an LED package according to the sixth embodiment of the present invention, and FIG. 16C is a view showing a color uniformity of an LCD including an LED package according to the sixth embodiment of the present invention. The LCD devices of FIGS. 16A, 16B and 16C have an optical gap of about 15 mm.

In FIG. 16A, the backlight unit of the LCD device has a wide light coverage region where the light is uniformly distributed. Since the LCD device uses the backlight unit having a wide irradiation angle and a high brightness, the LCD device displays an image of high quality. For example, the LCD device has substantially no stain as shown in FIG. 16B, and the LCD device displays a true color as shown in FIG. 16C.

Consequently, in the LCD device including the LED package according to an embodiment of the present invention, since the number of the LEDs is reduced, parts cost and fabrication cost of the LCD device are reduced. In addition, since the width of the LED lens is reduced by adjusting the light direction due to the lower curved surface, the parts cost is reduced. Further, since the light direction is adjusted due to the side surface having a slope, the peripheral light intensity of the LED package increases. Moreover, since the LED lens has a wide irradiation angle, the optical gap between the reflecting plate and the diffusing plate can be reduced and the LCD device having a thin profile can be obtained.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a light emitting diode (LED) printed circuit board (PCB);
an LED package on the LED PCB, the LED package having an LED and an LED lens on the LED, the LED lens having a substantially symmetrical shape with respect to a central axis; and
a liquid crystal panel on the LED package,
wherein the LED lens includes a lower surface having first and second lower surfaces, an upper surface and a side surface connecting the lower surface and the upper surface,
wherein a light incident on the first lower surface is substantially, totally reflected on the upper surface and is emitted through the side surface,
wherein the first lower surface includes a first curved surface extending from the central axis and a second curved surface extending from a first end portion of the first curved surface, and
wherein the second lower surface is flat and extends from a second end portion of the second curved surface.

2. The device according to claim 1, wherein a first central light from the LED is refracted at the first curved surface to become a second central light and a first stray light from the LED is refracted at the second curved surface to become a second stray light,
wherein a first angle of the first central light with respect to the central axis is smaller than a second angle of the second central light with respect to the central axis, and
wherein a third angle of the first stray light with respect to the central axis is greater than a fourth angle of the second stray light with respect to the central axis.

3. The device according to claim 1, wherein the lower surface further includes a third lower surface flat and disposed in a central portion of the LED lens.

4. The device according to claim 3, wherein the third lower surface has a width smaller than the second lower surface.

5. The device according to claim 1, wherein the upper surface includes a central surface which is one of a concave curved surface and a plane surface at a central portion thereof.

6. The device according to claim 5, wherein a width of the central surface is smaller than about 0.3 mm.

7. The device according to claim 5, wherein the upper surface further includes an edge surface flat and at an edge portion thereof.

8. The display device according to claim 7, wherein a width of the edge surface is equal to or smaller than a quarter of a radius of the LED lens.

9. The device according to claim 1, wherein the side surface includes a first slanting surface inwardly extending from an end portion of the upper surface with a first slope and a second slanting surface inwardly extending from the first slanting surface with a second slope smaller than the first slope.

10. The device according to claim 1, wherein the side surface includes a slanting surface outwardly slanting from an end portion of the upper surface and the light through the second lower surface is totally reflected on the slanting surface.

11. The device according to claim 10, wherein the LED lens further includes a protrusion between the lower surface and the side surface.

12. The device according to claim 11, wherein the LED lens further includes supporters which contact the LED PCB such that the LED lens is supported by and is fixed to the LED PCB and the supporters are connected to the protrusion.

13. The device according to claim 11, wherein a first tangent line at a first point of the first curved surface has a first tangent angle with respect to the central axis, and a second tangent line at a second point of the second curved surface has a second tangent angle with respect to the central axis, and
wherein the first tangent angle is an acute angle and the second tangent angle is an obtuse angle.

14. The device according to claim 1, wherein a width of the second lower surface is equal to or greater than about 2 mm and is smaller than a value obtained by subtracting a distance between a point of the second curved surface and a center point of the LED lens from a radius of the LED lens.

15. The device according to claim 14, wherein a first stray light from the LED is refracted at the second curved surface and an angle of the first stray light with respect to the central axis is a half of an irradiation angle of the LED package.

16. The device according to claim 1, wherein the LED lens further includes supporters which contact the LED PCB such that the LED lens is supported by and is fixed to the LED PCB and the supporters are connected to the one of the first and second lower surfaces.

17. A light emitting diode package, comprising:
a light emitting diode (LED); and
an LED lens over the LED, the LED lens having a symmetrical shape with respect to a central axis,
wherein the LED lens includes a lower surface having first and second lower surfaces, an upper surface and a side surface connecting the lower surface and the upper surface,
wherein the light through the first lower surface is totally reflected on the upper surface and is emitted though the side surface, wherein the first lower surface includes a first curved surface extending from the central axis and a second curved surface extending from a first end portion of the first curved surface, and wherein the second lower surface is flat and extends from a second end portion of the second curved surface.

18. The light emitting diode package according to claim 17, wherein a first central light from the LED is refracted at the first curved surface to become a second central light and a first stray light from the LED is refracted at the second curved surface to become a second stray light, wherein a first angle of the first central light with respect to the central axis is smaller than a second angle of the second central light with respect to the central axis, and wherein a third angle of the first stray light with respect to the central axis is greater than a fourth angle of the second stray light with respect to the central axis.

19. The light emitting diode package according to claim 17, wherein the side surface includes a first slanting surface inwardly extending from an end portion of the upper surface with a first slope and a second slanting surface inwardly extending from the first slanting surface with a second slope smaller than the first slope.

20. The light emitting diode package according to claim 17, wherein the side surface includes a slanting surface outwardly slanting from an end portion of the upper surface and the light through the second lower surface is totally reflected on the slanting surface.

* * * * *